Patented Feb. 16, 1937

2,070,694

UNITED STATES PATENT OFFICE 2,070,694

DECOLORIZATION OF RESINS

Charles A. Thomas and William H. Carmody, Dayton, Ohio, assignors, by mesne assignments, to The Neville Company, Neville Island, Pittsburgh, Pa., a corporation of Pennsylvania No Drawing. Application November 16, 1934, Serial No. 753,412

9 Claims. (Cl. 260—7)

This invention relates to the decolorization of hydrocarbon resins and it has particular application to hydrocarbon resins of the type which are formed by the polymerization, under the influence of organic acid reacting catalysts, of unsaturated hydrocarbons. The present application is a continuation-in-part of our copending applications Serial Numbers 617,478, filed June 15, 1932, and 727,065 filed May 23, 1934. The present application is directed specifically to resins obtained by the polymerization of naphtha hydrocarbons of coal tar origin as, for example, the so-called coumarone-indene type resin.

The object of the present invention is to provide an efficient, economical and convenient method of improving the color of artificial resins derived from an unsaturated liquid hydrocarbon distillate obtained in the coking of coal and polymerized by acid catalysts, such as sulfuric acid, aluminum chloride and/or similar acid reacting substances. A further object of the invention is to simplify and condense the steps heretofore employed in the manufacture of hydrocarbon resins of the type herein under consideration.

Earlier methods have been proposed heretofore for the decolorization of coumarone-indene type resins. However, these methods have not been entirely satisfactory and it has been customary rather to rely on careful selection of the raw materials to obtain a satisfactory polymerized product than upon a decolorizing operation which is employed after the polymerization, and it is therefore an additional object of our invention to provide a process wherein raw materials of inferior quality may be utilized successfully.

In our copending application Serial Number 617,478, filed June 15, 1932, we have shown that polymerized hydrocarbon resins may be decolorized effectively by means of fuller's earth or clay, preferably of the so-called activated type, by fluxing the clay and the resin in the absence of solvent. To this end the resin, while melted, is mixed with clay with rapid agitation and maintained at a relatively high temperature for a short period of time or a lower temperature for a comparatively longer period of time. During this operation the water which is normally present in the clay is driven off and the fused mixture then dissolved in a solvent whereupon the insoluble clay residue is separated from the resin solution. Alternatively, the fused mass may be solidified and pulverized before the addition of the solvent. A light colored solution is obtained in either case and the resin is recovered conveniently from the solution by evaporation of the solvent.

There is also disclosed in the aforementioned application an alternative process wherein the polymerized hydrocarbon mixture which contains the acid polymerizing agent is neutralized and decolorized simultaneously. For example, the polymerized mass before separation of the catalyst is treated with the activated clay whereupon neutralization is effected simultaneously with the decolorization. The application likewise discloses a method wherein the resin which is neutralized is decolorized by means of activated clay while dissolved in a solvent.

In the copending application Serial Number 727,065 there is set forth a process wherein a solution of hydrocarbon resins such, for example, as coumarone-indene resin is heated to an elevated temperature with activated clay, preferably under reflux conditions, whereby the color imparting impurities are developed and thereupon are effectively removed from the solution. A resin which is substantially free of color is thereby obtained.

The following detailed examples illustrate embodiments of our invention:

*Example 1.*—A coumarone-indene resin is dissolved in a suitable solvent as, for example, an aromatic hydrocarbon or alternatively a petroleum type hydrocarbon, to which there is added a finely ground activated bleaching clay. The suspension is refluxed at from 100° C.–150° C. for, say, 15 to 30 minutes. For most coumarone-indene type resins this operation is performed effectively at temperatures of approximately 125° C. Color producing constituents present in the resin appear to be decomposed at about 125° C. The materials which cause discoloration of the resin are thereby developed completely into an adsorbable form, adsorbed by the clay, and subsequently removed by the clay. Resins of the described types may be effectively decolorized by the method of this invention at widely varying temperatures.

The proportion of clay used may be varied widely, amounts varying from 1% to 100% by weight of the resin treated, having been found effective. However, the decolorizing treatment has been found to be effective with relatively small amounts of clay, so that use of large proportions of clay is not recommended. Amounts of clay as low as 1 gram per 100 cc. of resin solution with naphtha diluent have been found to be effective in decolorizing the resin. Certain imported "activated bleaching clays" as well as commercial fuller's earth, are found particularly effective for use according to this invention. These clays differ from fuller's earth in that they have been activated by a chemical process with acid, washed, neutralized, dried and ground. Two of these clays imported by the Harshaw Chemical Company of Philadelphia, and sold under the designation "Activated Bleaching Clay H-1" and "Activated Bleaching Clay H-15" have been found very satisfactory for this purpose. A domestic clay which is obtained in Georgia, known as Attapulgus clay, has been found to give very satisfactory results.

The resin solution may also be previously heated to a temperature of the order of 125° C. to decompose the color producing constituents, and the preheated solution then treated with clay at room temperature or at higher temperatures, as described above.

After the above described treatment with clay, for example clay H-1 or Attapulgus clay, the resin solution is separated from the clay by any convenient means, as by filtering. The color bearing constituents of the resin and any insoluble materials remain with the clay, and the filtered resin solution is usually substantially colorless. If the color of the solution has not been lightened to the desired extent, the clay treatment may be repeated using preferably a fresh batch of clay. The decolorized resin solution is then freed from solvent as by distillation, leaving a hard colorless or very light straw colored resin. This resin is found to produce a clear varnish, and appears to be equivalent in chemical and varnish making properties to the resin produced in the same manner without the clay treatment. In lieu of fuller's earth or the special clays referred to hereinabove, one may employ a calcined clay, preferably one which has been heated sufficiently high to remove combined water and thereby render the alumina present readily susceptible to the action of acids or acidic materials.

This decolorizing treatment may also be readily applied to the polymerized mass containing the resinous reaction product, at certain stages of the resin making process. For example, the polymerized mass at any time after polymerization may be decolorized with a suitable activated bleaching clay in the manner described above.

*Example 2.*—An acid polymerized coumarone-indene mixture is obtained preferably by causing a crude coal tar naphtha containing the resin forming unsaturates having a boiling range of approximately 160°–190° C., to polymerize in the presence of any suitable acid reacting catalyst such as sulfuric acid while maintaining the reaction mixture preferably not substantially above 20° C. The reaction mixture, without previous neutralization, and which consists of the polymerized resinous material dissolved in the unresinified coal tar naphtha which was present in the raw material, together with the sulfuric acid catalyst, is refluxed at 100°–150° C. with finely ground activated bleaching clay for approximately thirty minutes. The color producing constituents are thereby developed and adsorbed by the clay and the acid is neutralized and/or otherwise adsorbed by the clay. The proportion of clay may be varied widely up to 100% by weight of the resin treated or even more. In general, the decolorization treatment has been found to be effective with relatively small amounts of clay so that the use of large proportions of clay is not recommended; good results are obtained by adding clay in the ratio of 1 to 5 grams of clay per 100 cc. of polymerized resin solution. The simultaneous neutralization and decolorization are mutually cooperative to effect not only complete neutrality but also a decolorization which is distinctly superior as compared to decolorization obtained after neutralization, particularly when other decolorizing agents, such as charcoal or bonechar, are employed. After the decolorization and neutralization are complete, the suspended material is separated from the solution by decantation or filtration and the finished resin is recovered from the solvent in the usual manner.

*Example 3.*—In lieu of activating clay, as described in Example 2, substitute an equivalent quantity of Attapulgus clay or a clay which has previously been calcined to remove the combined water as by heating the same to incipient fusion. For this latter purpose kaolin will be found suitable.

*Example 4.*—In lieu of the treatments described in the previous examples wherein a polymerized resin of coal tar solvent origin is subjected to the action of clay while dissolved in a solvent, one can treat the resin while in a fluxed or liquid state, containing little or no solvent, by mixing the clay with the resin, preferably at a temperature sufficiently high to dry off water from the clay; for example, a temperature of the order of 200°–210° C. for a period of 5 to 10 minutes will be found effective. Under these conditions the color impurity is developed while at the same time it is adsorbed by the clay. The resin in the fluxed mass is then dissolved in a solvent, for example, hydrocarbon solvents of a petroleum origin or hydrocarbons which are commonly associated with the resin forming constituents and the clay and other residue separated therefrom. Alternatively, the fused mixture can be cooled to effect solidification and then pulverized, after which a solvent is added. The insoluble matter is then separated by filtration.

A light colored solution is thus obtained from which the resin is recovered by removal of the solvent.

*Example 5.*—In Example 2 there is described a procedure wherein the acid catalyst is eliminated and the resin is decolorized more or less simultaneously by adding clay to the polymerized mixture. In the following example the polymerized mass, preferably after dilution with one or more parts of a petroleum naphtha, is neutralized with a base such as caustic soda, after which the color forming impurities are developed by the heat treatment described heretofore, and removed by means of clay. In this as well as the foregoing examples, the polymerization per se forms no part of the invention insofar as the selection of a suitable polymerizing catalyst is concerned. A large variety of catalysts are well known to those skilled in the art, the most common one of which is perhaps sulfuric acid due in part to its suitability and cheapness. It is to be understood, however, that the use of other polymerizing agents falls within the spirit of this invention.

Following the procedure outlined in the preceding paragraph, a crude solvent coal tar naphtha containing the coumarone-indene constituents is diluted with from 1 to 4 parts of petroleum naphtha and polymerized with a suitable catalyst, such as sulfuric acid, under conditions which are well known to those skilled in the art. After the polymerization is completed the reacted mixture is neutralized by agitating the same in the presence of an aqueous sodium hydroxide solution.

The neutralized mass is then washed with water to remove excess caustic and sodium sulfate, after which it is permitted to settle so as to give a clear resin solution. To effect decolorization the resin solution is heated to about 125° C. for about 30 minutes whereby the color forming compounds are developed and rendered separable by the clay. Attapulgus clay is then added in amounts of one to three grams per 100 cc. of solution and the suspension is again heated to 125° C. for about a half hour, after which the clay is removed by filtration. Upon removal of the solvent a decolorized, hard resinous product is obtained which is ready for sale or further use.

One should understand that in the foregoing examples the time of heating to develop the color forming impurities may be varied depending to a large extent upon the nature of the raw material being treated. Similarly it is to be understood that the amount of clay required may be varied according to the time of reaction, the effectiveness of the particular grade of clay employed, and the amount and nature of impurities to be eliminated.

Although there have been set forth hereinabove a number of examples illustrating various embodiments of our invention according to which coumarone-indene type resins or resins derived from liquid coal tar naphtha fractions are polymerized and subsequently decolorized by treatment with clay, under various conditions which serve to develop the color forming impurities completely and render the same separable by the adsorptive action of the clay, it is to be understood that the invention is not limited to the examples specifically set forth but that it is susceptible to other variations without departing from the spirit thereof.

What we claim is:

1. The method of decolorizing a resin obtained by the polymerization of crude coal tar naphtha under the influence of an acidic polymerizing agent which normally results in an off-colored product, which comprises treating a preformed resin of this type with clay, subjecting the mixture to heat conditions sufficient to render adsorbable the color-producing impurities associated with the resin and to provide for complete adsorption in the clay of the impurities so developed and thereafter separating the clay from the resin.

2. The process of claim 1 wherein the clay is an activated clay.

3. The process of claim 1 wherein the clay is Attapulgus clay.

4. The method of decolorizing a resin obtained by the polymerization of crude coal tar naphtha under the influence of an acidic polymerizing agent which normally results in an off-colored product, which comprises fluxing a preformed resin of this type with clay under heat conditions sufficient to render adsorbable the color-producing impurities associated with the resin and to provide for complete adsorption in the clay of the impurities so developed, dissolving the resin in a solvent and separating the insoluble clay from the solution and recovering the resin from the solvent.

5. The method of decolorizing a resin obtained by the polymerization of crude coal tar naphtha under the influence of an acidic polymerizing agent which normally results in an off-colored product, which comprises dissolving a preformed resin of this type in a hydrocarbon solvent, adding adsorptive clay to the solution, maintaining the solution at a temperature of approximately 100°–150° C. for a period of from approximately 15 to 30 minutes in order to render adsorbable the color-producing impurities associated with the resin and to provide for complete adsorption in the clay of the impurities so developed, separating the clay from the solution and recovering the resin from the solvent.

6. The method of decolorizing a resin obtained by the polymerization of crude coal tar naphtha under the influence of an acidic polymerizing agent which normally results in an off-colored product, which comprises reacting the resin with clay after polymerization and while the resin is still associated with the residual liquid hydrocarbons and the acid polymerizing agent to effect simultaneous neutralization and decolorization, separating the insoluble matter, and finally recovering the resin from the solvent.

7. The method of decolorizing a resin obtained by the polymerization of crude coal tar naphtha under the influence of an acidic polymerizing agent which normally results in an off-colored product, which comprises first neutralizing the resin after its formation, washing the same with water, subjecting the solution of resin to the decolorization action of clay under heat conditions which develop the color and render the color-producing impurities adsorbable by the decolorizing clay.

8. The process of claim 7 in which the polymerization and decolorization are effected in the presence of a petroleum naphtha diluent.

9. The method of decolorizing a resin obtained by the polymerization of crude coal tar naphtha under the influence of an acidic polymerizing agent which normally results in an off-colored unneutralized product, which comprises treating a preformed resin of this type with clay, subjecting the mixture to heat conditions sufficient not only to neutralize the product by the clay but also to render adsorbable the color-producing impurities associated with the resin and to provide for complete adsorption in the clay of the impurities so developed and thereafter separating the clay from the resin.

CHARLES A. THOMAS.
WILLIAM H. CARMODY.